United States Patent [19]

Tsutsui et al.

[11] Patent Number: 4,980,933
[45] Date of Patent: Jan. 1, 1991

[54] WASHING DEVICE FOR PARTS OF HUMAN BODY

[75] Inventors: Osamu Tsutsui; Hisato Haraga; Kiyoshi Fujino; Yoshinobu Uchimura; Yoshiki Kawamura, all of Chigasaki, Japan

[73] Assignee: Toto Ltd., Fukuoka, Japan

[21] Appl. No.: 375,215

[22] Filed: Jul. 3, 1989

[30] Foreign Application Priority Data

Jul. 5, 1988 [JP] Japan ................... 63-168447

[51] Int. Cl.$^5$ .............................................. A47K 3/20
[52] U.S. Cl. ..................... 4/420.2; 4/420.4; 4/443; 4/192
[58] Field of Search ...... 4/192, 213, 191, 420.1–420.5, 4/443–448

[56] References Cited

U.S. PATENT DOCUMENTS

| 3,513,487 | 5/1970 | Palermo et al. | 4/420.4 |
| 4,044,408 | 8/1977 | Pearson | 4/213 |
| 4,135,255 | 1/1979 | Menendez | 4/448 |
| 4,237,560 | 12/1980 | Riegelman et al. | 4/420.2 X |
| 4,551,868 | 11/1985 | Kawai et al. | 4/443 |
| 4,696,428 | 9/1987 | Shakalis | 4/192 X |
| 4,761,836 | 8/1988 | Tsutsui et al. | 4/420.2 |
| 4,774,978 | 10/1988 | Lepine, Jr. et al. | 4/192 |
| 4,854,499 | 8/1989 | Neuman | 4/192 X |

Primary Examiner—Henry K. Artis
Attorney, Agent, or Firm—Jordan and Hamburg

[57] ABSTRACT

A washing device for parts of human body comprises a thermostatic mixing valve which is disposed at a junction of a cold water supply passage and a heated water supply passage, a latching solenoid valve which is mounted on a heated water drainage passage branched out from said heated water supply passage and a latching solenoid valve which is mounted on a mixed hot water supply passage. Due to such construction, electric power for heating water is no longer necessary in the toilet bowl and electric power for mixing heated water and cold water to produce mixed hot water to be ejected from an ejecting nozzle also becomes unnecessary. Furthermore, electric power for operating the solenoid valve is minimized by means of a latching solenoid. Accordingly, the overall consumption of electric power necessary for operating and controlling the washing device can be minimized thus enabling the use of a small dry cell or battery as an electric power source of the washing device.

10 Claims, 6 Drawing Sheets

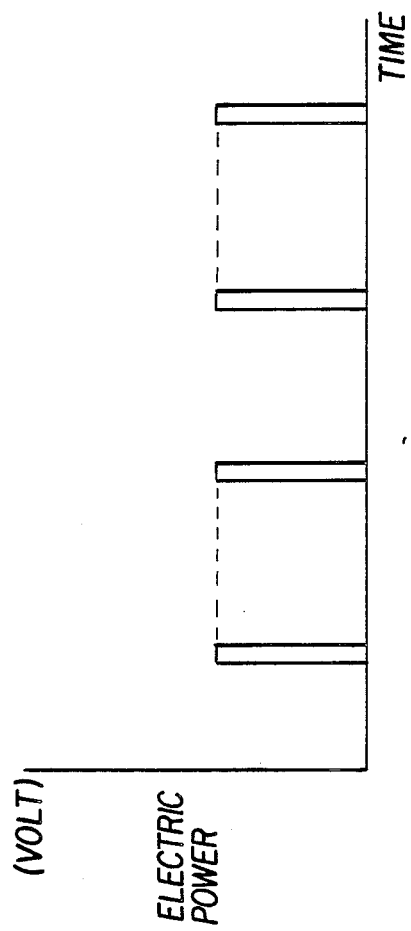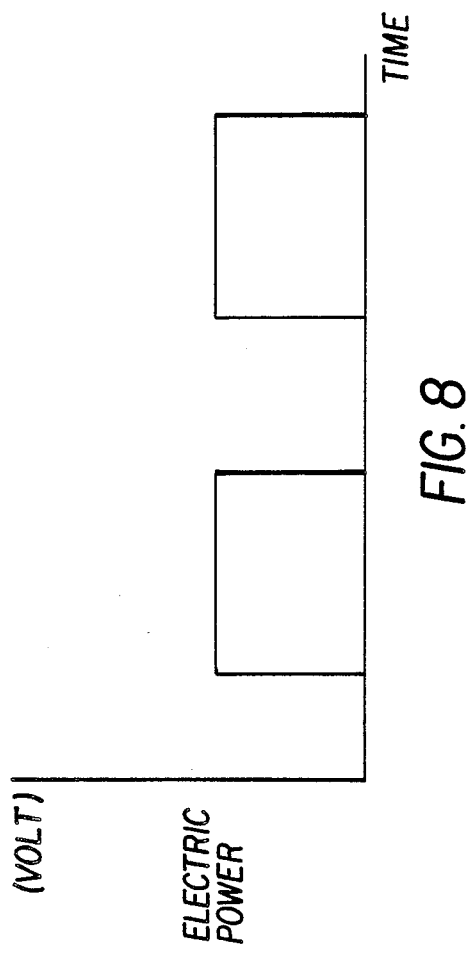

WASHING DEVICE FOR PARTS OF HUMAN BODY

BACKGROUND OF THE INVENTION

This invention relates to a washing device for parts of human body.

Conventionally, there have been several kinds of toilet bowls which are equipped with a washing device for parts of human body. The washing device includes a cleaning nozzle which is disposed in the toilet bowl and such cleaning nozzle can eject hot water of a desired temperature for cleaning the private parts.

The conventional washing devices are classified into two categories depending on the manner of producing hot water, wherein, in one category, hot water is produced by using an electric heater which is built in or mounted on the toilet bowl and the hot water is ejected through the cleaning nozzle, and in the other category, heated water and cold water are supplied from outside of the toilet room and mixed hot water of a desired temperature is produced by mixing heated water and cold water by means of an electrically controlled mixing device and such mixed hot water is ejected through the nozzle.

In addition, such washing devices employ solenoid valves for controlling the ejection of hot water of a desired temperature.

As mentioned above, a conventional washing device comprises an electric heater, an electrically controlled mixing device, or an electrically operated solenoid valve so that the washing device consumes a large quantity of electricity. Namely, the washing device has to be operated by electric power from a commercially available electric power source of high voltage alternating current.

Accordingly, conventional washing devices require the inclusion of such electric devices as those for converting alternating current to direct current, whereby the mixing device as a whole, or the solenoid valves, in particular, become large-sized.

Furthermore, due to the high voltage of the commercially available electric power source, when the insulating capacity of the above mentioned electrically operated devices is lowered by moisture in the atmosphere, a user may receive an electric shock may attack or electricity may leak to cause a fire.

SUMMARY OF THE INVENTION

According to the present invention there is provided a washing device for parts of human body which overcomes the above mentioned defects of conventional washing devices wherein the improvement is characterized in that a thermostatic mixing valve is disposed at a junction of a cold water supply passage and a heated water supply passage, that a latching solenoid valve is mounted on a heated water drainage passage branched out from said heated water supply passage and that a latching solenoid valve is mounted on a mixed hot water supply passage.

According to this invention, since heated water is supplied from outside of the toilet room, electric power for heating the water becomes unnecessary for the toilet bowl or the toilet room.

Furthermore, heated water and cold water are mixed to produce mixed hot water by the thermostatic mixing valve which requires no electric power for its operation.

Still furthermore, once a solenoid valve provided with a latching function is opened or closed by activation with a small amount of electricity, the solenoid valve can holds its opened or closed position even when electricity is not supplied continuously thereafter, electricity being required for the subsequent closing or opening operations of the solenoid valve. Thus, the consumption of electricity is reduced to a small level.

Accordingly, small dry cells or batteries can be used as an electric power source for controlling the washing device for parts of human body and a large sized unit which is necessary for converting alternating current to direct current becomes unnecessary.

Since the small dry cells or batteries are of low voltage, it is not necessary to consider insulation and the possibility of an electric shock or a fire is completely prevented, thereby assuring the safeness of the washing device.

Still furthermore, since electric wiring is minimized, the installation of the washing device to the toilet bowl can be readily conducted.

Conventionally, washing devices have been used mainly in general households, and the washing device having a built-in heater has prevailed since some general households are not provided with a heated water supply system.

However, recently, a heated water supply system has become more common in general households, while multi storied buildings such as hotels are generally equipped with a heated water supply system for bathroom use. Accordingly, the washing device of this invention is expected to have wide application in such general households and hotels.

BRIEF DESCRIPTION OF THE DRAWINGS

FIG. 7 is a diagram showing the manner of operation of a solenoid valve of the present invention operated by the latching solenoid.

FIG. 8 is a diagram showing the manner of operation of a conventional solenoid valve.

DETAILED DESCRIPTION OF PREFERRED EMBODIMENTS OF THE INVENTION

Preferred embodiments of this invention are described in detail with reference to accompanying drawings.

Figure 1:
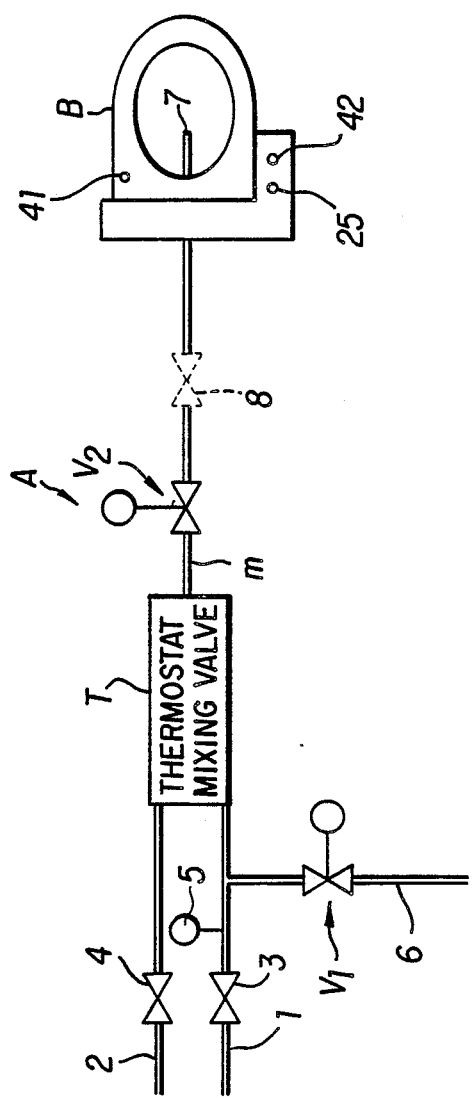
FIG. 1 is a block diagram schematically showing the overall construction of a washing device for parts of a human body according to this invention.

FIG. 1 shows schematically an overall construction of a washing device A for human body parts according to this invention.

In the drawing, numeral 1 indicates a heated water supply passage and numeral 2 indicates a cold water supply passage. A mixing valve (device) T using a thermostat is disposed at a junction where the heated water supply passage 1 and the cold water supply passage 2 are connected. Constant flow regulating valves 3, 4 are provided in the heated water supply passage 1 and the cold water supply passage 2 respectively.

The heated water supply pipe 1 is also provided with a temperature detecting means 5 for monitoring the temperature of the heated water. In this embodiment, the temperature detecting means 5 may be a thermistor.

Between the temperature detecting means 5 and the mixing valve T, a heated water drain passage 6 is branched out from the heated water supply passage 1 for draining the heated water, which may be lukewarm.

A solenoid valve $V_1$ which is equipped with a latching solenoid is mounted on the heated water drain passage 6.

The mixing valve T has the outlet portion thereof connected with an upstream end of a mixed hot water supply passage m, which, in turn, has the downstream end thereof connected to a cleaning nozzle 7 disposed in a toilet bowl B.

The mixed hot water supply passage m is provided with a solenoid valve $V_2$ for regulating the mixed hot water to be ejected from the cleaning nozzle 7 and such solenoid valve $V_2$ is also provided with a latching solenoid similarly to the above mentioned solenoid valve $V_1$.

As shown in FIG. 2 to FIG. 5, the constant flow regulating valve 3 or 4 substantially comprises a housing 50 to be inserted in a path 31 and a core member 51 as well as an elastic O-shaped ring 52 both of which are fixedly mounted in the housing 50.

The housing 50 is cylindrical, and in a condition where the housing 50 is inserted in the path 31, the housing 50 has a rear shoulder portion 53 for fixing the core member 51 at an opening end on the upstream portion of the housing 50 and a front shoulder portion 54 for fixing the O-shaped ring 52 at an open end on the downstream portion of the housing 50.

The core member 51 has a bullet-shaped head which extends in a downstream direction. The core member 51 is provided with a flange 56 at the rear end portion thereof and a water passing opening 55 is formed in the central portion of the flange 56. The core member 51 is also provided with a plurality of axially-extending projections 57 on the outer surface thereof and these projections 57 are disposed in a parallel spaced apart manner in a circumferential direction.

The core member 51 is fixedly mounted in the housing 50 by means of the flange 56 and the shoulder portion 53, and the head portion thereof is loosely inserted in the internal opening 50b formed in the central portion of the shoulder portion 54 and the extremity of such head portion of the core member 51 extends through the internal opening 50b.

The O-shaped ring 52 is loosely disposed between the internal periphery of the housing 50 and the external periphery of the core member 51, and such ring 52 is held in place in the housing 50 by the shoulder portion 54.

The constant flow regulating valves 3 and 4 which have the above mentioned structure are inserted in the path 31 of the heated water supply passage 1 and the cold water supply passage 2.

The water which flows in the path 31 firstly passes through the water passing opening 55, and subsequently passes through a gap 59 defined between the core member 51 and the O-shaped ring 52 and finally passes through a gap 60 between the inner periphery of the shoulder portion 54 and the core member 51 leading to the mixing valve T.

Figure 2:
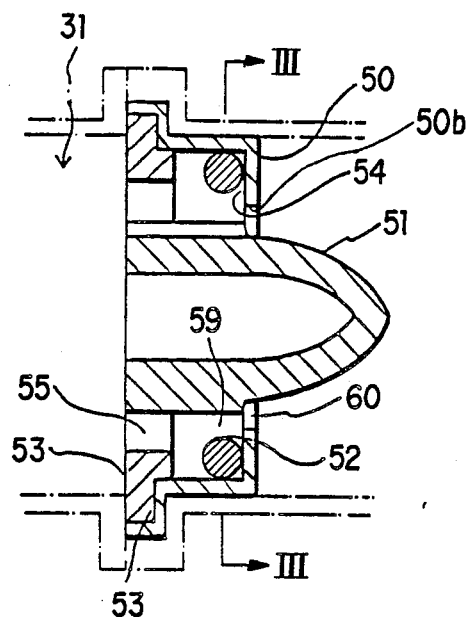
FIG. 2 is a cross sectional view of a constant flow regulating valve.
Figure 3:
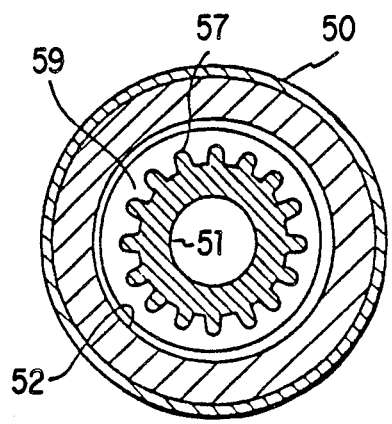
FIG. 3 is a cross sectional view of the constant flow regulating valve taken along the line III—III of FIG. 2.

In the above movement of the water flow, when the pressure of the water to be supplied to the path 31 is at a normal pressure or lower than the normal pressure, the O-shaped ring 52 is subject to no deformation and the gap 59 between the O-shaped ring 52 and the core member 51 defines a predetermined water passing area, as shown in FIG. 2 and FIG. 3.

Figure 4:
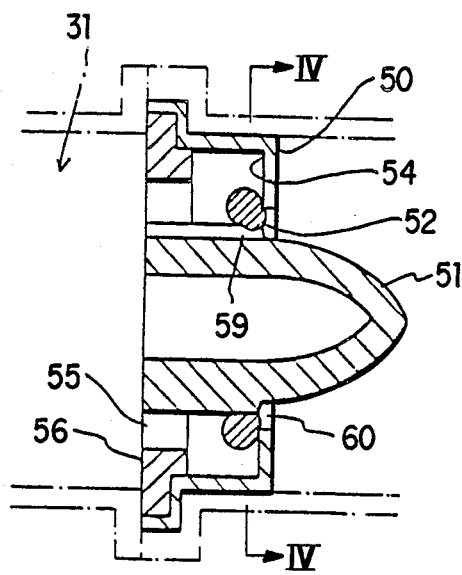
FIG. 4 is a cross sectional view of the constant flow regulating valve.
Figure 5:
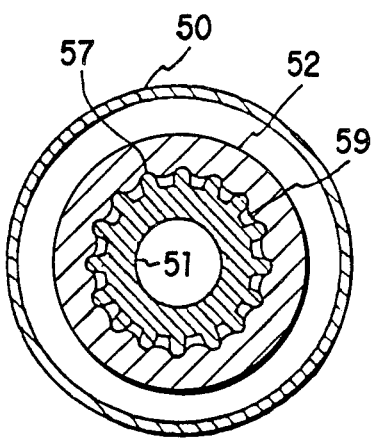
FIG. 5 is a cross sectional view of the constant flow regulating valve taken along the line V—V of FIG. 4.

On the other hand, when the water pressure becomes higher than the normal pressure, such pressure makes the shoulder portion 54 press and deform the O-shaped ring 52 as shown in FIG. 4 and FIG. 5, thereby reducing the water passing area in the gap 59 defined between the O-shaped ring 52 and the core member 51.

Furthermore, as the water pressure becomes even higher, the O-shaped ring 52 is still further deformable and therefore the water passing area is further reduced to decrease the flow rate or speed of the water.

Namely, such constant water flow regulating valves 3, 4 serve to supply a constant volumetric flow rate of water to the downstream portion irrespective of the varying of the water pressure.

Although, in this embodiment, the constant water flow regulating valves 3, 4 are mounted in the cold water supply passage 1 and the heated water supply passage 2 respectively, alternatively a constant water flow regulating valve 8 (shown in phantom in FIG. 1) may be mounted in the mixed hot water supply passage m to achieve the same flow regulating effect.

Figure 6:
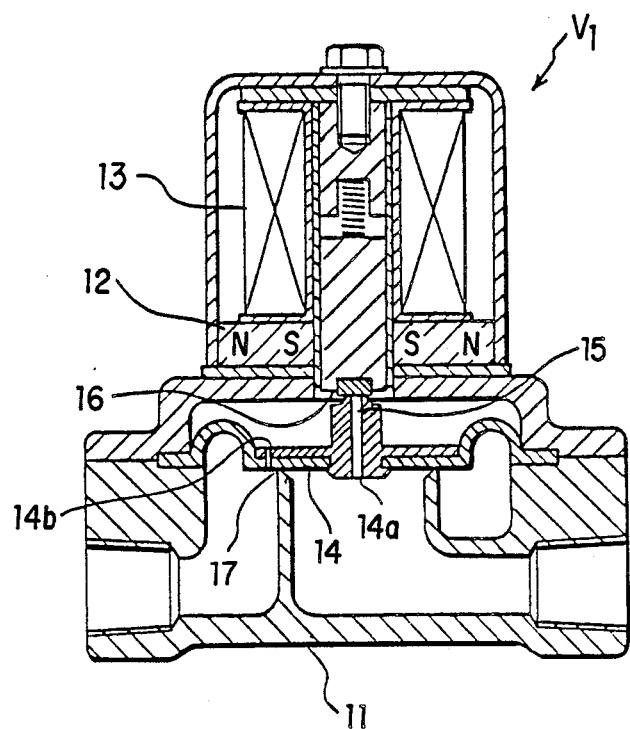
FIG. 6 is a cross sectional view of a solenoid valve using a latching solenoid.

In FIG. 6, the solenoid valves $V_1$, $V_2$ which are operable with a latching solenoid 13 are shown. The solenoid 13 having a permanent magnet 12 for latching purpose is disposed on one side of a diaphragm type valve body 11.

When the latching solenoid 13 is energized electrically receiving either a positive or negative voltage or charge, a pilot valve body 16 is operated to open or close a pilot valve seat 15 mounted on a diaphragm 14. A main valve seat 17 is opened or closed by operating the diaphragm 14 making use of the difference of the water pressure between two water pressures which act on the top and bottom surfaces of the diaphragm 14 respectively. In FIG. 6, the diaphragm 14 is provided with a pilot opening 14a and a bleed opening 14b.

Such a difference of the water pressure is held by maintaining an opened or closed position of the pilot valve body 16 magnetically with use of the permanent magnet 12, thus firmly holding the main valve seat 17 at the closed position or the opened position.

Accordingly, in the solenoid valves $V_1$, $V_2$, the latching solenoid 13 actuates only a pilot valve body 16, and it is sufficient to energize such valves $V_1$, $V_2$ only at the time of opening and closing operation thereof, thus resulting in the extremely low consumption of the electric power.

As shown in FIG. 7, in this embodiment, pulse-like electric power or voltage is applied to the solenoid valves $V_1$, $V_2$ whereas in FIG. 8 where the manner of operation of the conventional solenoid valve is shown, the electric power or voltage has to be applied continuously for each opening or closing operation.

Figure 9:
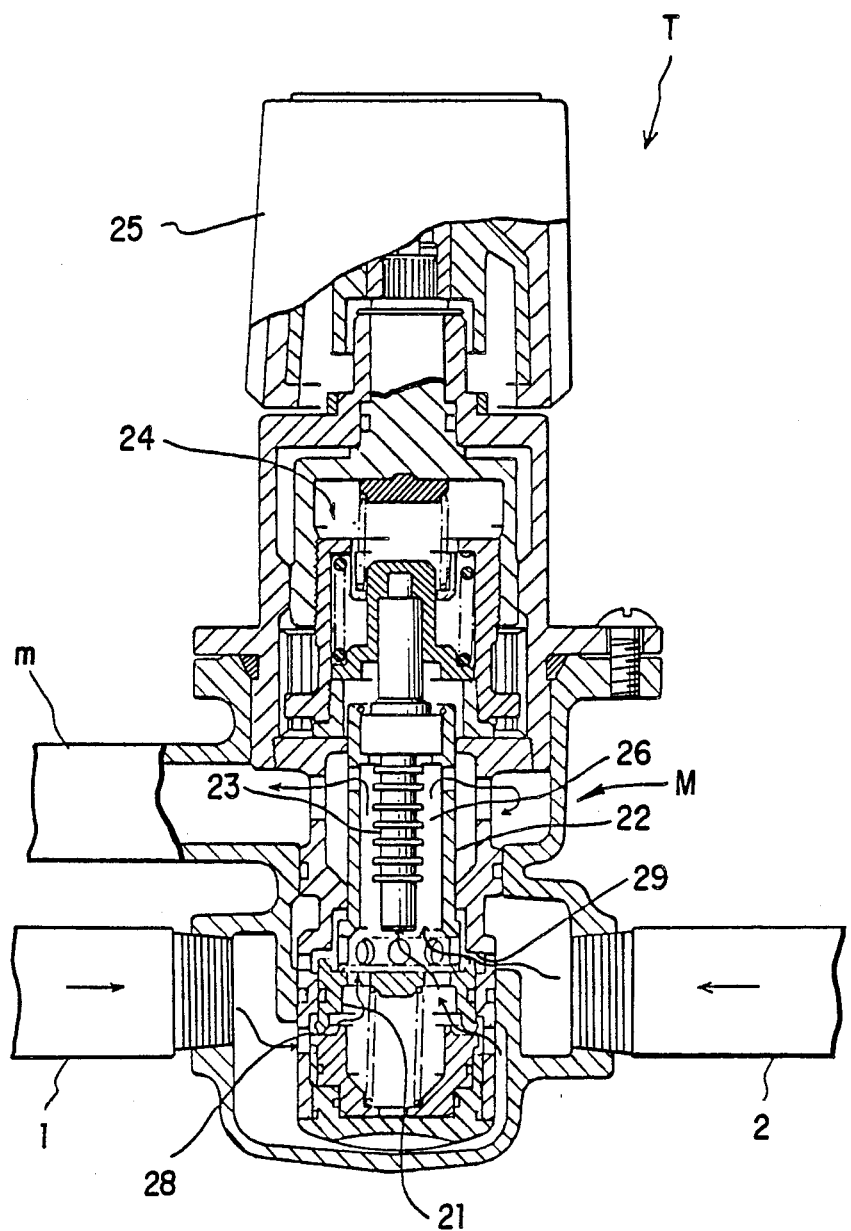
FIG. 9 is a partially cross sectional view of a thermostatic mixing valve using a latching solenoid.

The construction of a mixing valve T using a thermostat is shown in FIG. 9.

As previously explained in view of FIG. 1, the mixing valve T is provided at the junction where the heated water supply passage 1 and the cold water supply passage 2 meet.

Inside the main body M of a cylindrical shape, an inner cylinder 22 and a valve body 21 are disposed, wherein the inner cylinder 22 is disposed at the upper portion of the main body M and defines a water mixing chamber 26 while the valve body 21 is disposed at the lower portion of the main body M.

A thermostat 23 of a type using wax is disposed in the inner cylinder 22, and the upper end of such thermostat 23 is connected to an adjusting knob 25 by means of an adjustment mechanism 24 using a screw. Accordingly, the rotation of the knob 25 causes the thermostat 23 to move upwardly or downwardly.

The lower portion of the thermostat 23 where the wax is contained is inserted in the mixing chamber 26 of the inner cylinder 22, while the middle portion of the thermostat 23 is connected to the upper end of the inner cylinder 22.

Due to the expansion or contraction of the wax caused by the change of the temperature of the mixed hot water in the mixing chamber 26, the middle portion of the thermostat 23 is moved and such movement is transmitted to the valve body 21 connected to the lower end of the inner cylinder 22.

Accordingly, a heated water valve opening 28 and a cold water valve opening 29 which are formed in the upper and lower ends of the valve body 21 are opened or closed to change the mixing ratio of the heated water and cold water which flow into the mixing chamber 26. Accordingly, the temperature of the mixed hot water which is discharged from the mixing chamber 26 and is ejected from the cleaning nozzle 7 in the toilet bowl B by way of the mixed hot water passage m accurately corresponds to the temperature preset by manipulation of the adjusting knob 25.

In particular, the thermostat 23 is automatically actuated by using the deviation between the temperature of the mixed hot water and the preset temperature to carry out a proportional control action so that the actuation of the thermostat 23 requires no power, including electric power.

Figure 10:
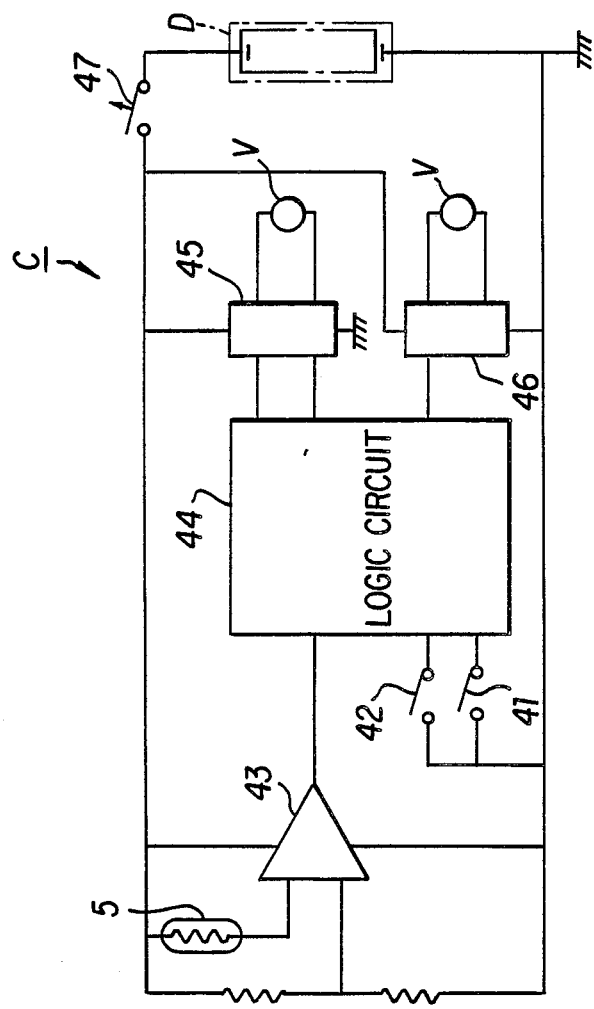
FIG. 10 is a block diagram showing the construction of a control device.

A control device C for controlling the solenoid valves $V_1$, $V_2$ and the temperature detecting means 5 which form the washing device of this invention is disclosed in FIG. 10.

The control device C comprises (a) a seating detecting sensor 41 of a reflection type using ultrasonic waves or infrared rays for detecting that a user sits on the toilet bowl, (b) a push button 42 for ejecting the water, (c) a comparator 43 which is connected to the temperature detecting means 5 and generates an output signal when the heated water in the heated water supply passage 1 reaches a predetermined temperature, (d) a logic circuit 44 having the input portion thereof connected to the above mentioned sensor 41, the push button 42 and the comparator 43, (e) a pair of drive circuits 45, 46 which are interposed between the output portion of the logic circuit 44 and the solenoids 13, 13 of the solenoid valves $V_1$, $V_2$, (f) a dry cell D (for example, 2CR5/DC 6V of SANYO Co, Ltd) as an electric power source, and (g) a power switch 47 for turning on or off the electric power source D.

In using the washing device A having the above construction, when the power switch 47 is turned on and the user sits on the seat of the toilet bowl B equipped with such washing device A, the seating detecting sensor 41 generates an output signal. The output signal is transmitted to the solenoid valve $V_1$ by way of the logic circuit 44 to open the solenoid valve $V_1$ and the valve is held open until the temperature detecting means 5 detects the appropriate temperature for producing the mixed hot water of a desired temperature.

Thus, the residual or remaining lukewarm water in the heated water supply passage 1 is drained initially so as to prevent the ejection of the lukewarm mixed water to the user's private parts.

Then, when the user presses or pushes the push button 42 for ejecting the hot water after use, the solenoid valve $V_2$ for ejecting the mixed hot water is opened, and the mixed hot water, the temperature of which is initially set by the user with the manipulation of the adjusting knob 25, is ejected from the cleaning nozzle 7 in the toilet bowl B to clean the user's private parts.

After cleaning of the user's private parts, the user again presses the push button 42 so that the solenoid valve $V_2$ is closed to stop the ejecting of the mixed hot water.

The electric power necessary for operating the above mentioned control is supplied from the dry cell D; only two solenoid valves $V_1$, $V_2$, the temperature detecting means 5, the seating detecting sensor 41, and the logic circuit 44 require the supply of the electric power.

Since the power consumption of the temperature detecting means 5 and the seating detecting sensor 41 is extremely low and the solenoid valves $V_1$, $V_2$ are to be energized only at the time of opening or closing operation, an extremely small amount of electric power is consumed. Accordingly, the dry cell D enjoys a prolonged life and can be used for a long time without exchange.

The power consumption can be reduced further by making the seating detecting sensor 41 shoot the ultrasonic waves or infrared rays toward the user intermittently.

Still furthermore, in place of the above mentioned seating detecting sensor 41, a micro switch may be installed in the toilet bowl B at a position where the weight of human body is applied and such micro switch may be interposed between the control device C and the dry cell D. In operation, only when a user sits on the toilet bowl B, is the control device C electrically connected with the dry cell D so that no power is consumed when the user is not sitting on the toilet bowl B.

As mentioned above, according to this invention, since the hot water is supplied from outside to the toilet room or the bathroom, it is unnecessary to install any heater such as an electric heater in the toilet room. The mixing valve which uses a thermostat also requires no power.

In addition, it is sufficient to energize the solenoid valves using a latching solenoid just at the time of opening or closing the solenoid valves so that the consumption of the electric power is reduced drastically from this aspect as well.

Furthermore, the washing device can be controlled by employing a dry cell as an electric source, no other direct current power source is required and the low voltage of the dry cell completely resolves the problems concerned with electric insulation such as the possibility of an electric shock and a fire, thus assuring safety.

Still furthermore, since the electric wiring necessary for the installation of the washing device can be minimized or eliminated, the installing operation can be conducted more readily.

We claim:

1. A washing device for parts of human body used in combination with a toilet bowl and comprising a heated water supply passage having a downstream end, a cold water supply passage having a downstream end, a thermostatic mixing valve disposed at a junction where the downstream ends of said heated water supply passage and said cold water supply passage are merged, a mixed hot water supply passage having an upstream end thereof said upstream end connected with the outlet of said mixing valve, a latching solenoid valve in the mixed hot water supply passage and an ejecting nozzle disposed in the toilet bowl, said ejecting nozzle having an inlet thereof connected with the downstream end of said mixed hot water supply passage, said thermostatic mixing valve being connected to no source of electricity and comprising a valve casing containing a wax which is expandable or contractable corresponding to an increase or decrease, respectively, of temperature of the mixed hot water and further comprising means for setting the mixing valve to a desired mixed hot water temperature whereby the mixing ratio of hot water and cold water is changed until said mixed hot water reaches said desired temperature, said latching solenoid valve comprising a latching solenoid operatively connected to a valve, the latching solenoid being electrically activatable upon receiving an electric signal to open or close said valve, the latching solenoid including a permanent magnet for holding the valve open or closed even after the supply of electricity is stopped.

2. A washing device for parts of human body according to claim 1, further comprising a heated water drainage passage branched out from said heated water supply passage and a latching solenoid valve mounted in said heated water drainage passage.

3. A washing device for parts of human body according to claim 2, further comprising a temperature detecting means mounted in said heated water supply passage for transmitting a control signal to a control device which in turn transmits an operation signal to said latching solenoid mounted in said heated water drainage passage.

4. A washing device for parts of human body according to claim 3, wherein said temperature detecting means is a thermistor.

5. A washing device for parts of human body according to claim 1, further comprising a dry cell for providing electricity to said latching solenoid valve.

6. A washing device for parts of human body according to claim 1, further comprising a pair of constant flow regulating valves mounted in said heated water supply passage and said cold water supply passage respectively.

7. A washing device for parts of human body according to claim 1, further comprising a constant flow regulating valve mounted in said heated water supply passage, said constant flow regulating valve being capable of supplying a constant volumetric flow rate of heated water to downstream of said constant flow regulating valve irrespective of the varying of the water pressure in said heated water supply passage upstream of said constant flow regulating valve.

8. A washing device for parts of human body according to claim 1, wherein a constant flow regulating valve is mounted in said cold water supply passage, said constant flow regulating valve being capable of supplying a constant volumetric flow rate of cold water downstream of said constant flow regulating valve irrespective of the varying of the water pressure in said cold water supply passage upstream of said constant flow regulating valve.

9. A washing device for parts of human body according to claim 7, wherein a constant flow regulating valve is mounted in said cold water supply passage, said constant flow regulating valve being capable of supplying a constant volumetric flow rate of cold water downstream of said constant flow regulating valve irrespective of the varying of the water pressure in said cold water supply passage upstream of said constant flow regulating valve.

10. A washing device for parts of human body according to claim 1, wherein a constant flow regulating valve is mounted in said mixed hot water supply passage, said constant flow regulating valve being capable of supplying a constant volumetric flow rate of mixed hot water downstream of said constant flow regulating valve irrespective of the varying of the water pressure in said mixed hot water supply passage upstream of said constant flow regulating valve.

* * * * *